United States Patent [19]
Thigpen et al.

[11] Patent Number: 5,474,799
[45] Date of Patent: Dec. 12, 1995

[54] APPARATUS AND METHOD FOR COATING AN ELECTROMAGNETIC COIL

[75] Inventors: James L. Thigpen, Gainesville, Ga.; Walter G. Stiffler, Mentor, Ohio; James B. Keys, Oakwood, Ga.; David T. McKinney, Gainesville, Ga.; Sidney Bell, Athens, Ga.

[73] Assignee: Reliance Electric Industrial Company, Cleveland, Ohio

[21] Appl. No.: 960,135

[22] Filed: Oct. 13, 1992

[51] Int. Cl.⁶ ........................................ B05D 5/12
[52] U.S. Cl. .......................... 427/104; 118/66; 118/313; 118/695; 118/696; 222/1; 427/116; 427/318; 427/379; 427/386; 427/424
[58] Field of Search .................... 427/116, 318, 427/386, 425, 426, 104, 379, 424; 222/1; 118/66, 313, 695, 696

[56] References Cited

U.S. PATENT DOCUMENTS

| | | | |
|---|---|---|---|
| 3,247,004 | 4/1966 | Dosser | 427/104 |
| 3,991,232 | 11/1976 | Kamiuchi | 427/116 |
| 4,485,126 | 11/1984 | Gaietto | 427/116 |
| 4,559,698 | 12/1985 | Bair | 427/116 |
| 4,788,761 | 12/1988 | Crawford | 427/116 |
| 4,842,895 | 6/1989 | Crawford | 427/116 |

OTHER PUBLICATIONS

P. A. Timmons, *Energy Savings Trickle Impregnation v. Oven Curing*, Sep. 12, 1981.
P. A. Timmons, *Fast Impregnation Systems Past, Present, Future*, Oct. 11, 1968.
H. P. Walker, *Tests show improvement in solventless varnish*, Sep. 1969.
Gegard® SP180 brochure.
Epoxylite® #230 Sav–A–Day Process brochure.

*Primary Examiner*—Michael Lusignan
*Attorney, Agent, or Firm*—Jones & Askew

[57] ABSTRACT

There is disclosed a method and apparatus for coating an electromagnetic coil, particularly stator coils for an electric motor, with an insulating catalyzed resin material. The catalyzed resin material is a two component material comprising an epoxy resin and a catalyst. The catalyzed resin material is a free flowing liquid at a first temperature and begins to cure rapidly at a second elevated temperature. The stator coils are first heated by supplying current to the stator coils to raise the temperature of the stator coils to the first temperature. The free flowing liquid catalyzed resin material is dispensed through nozzles onto the stator coils as the stator coils and the nozzles move relative to each other. After the liquid catalyzed resin material has been dispensed in a predetermined amount, at predetermined locations, for predetermined times, the catalyzed resin material is allowed to penetrate the stator coils. The temperature of the stator coils is then raised to the second temperature at which the curing of the catalyzed resin material occurs rapidly. As the curing continues, heat is produced by the curing process, and the current to the stator coils is shut off at a predetermined temperature.

50 Claims, 8 Drawing Sheets

APPARATUS AND METHOD FOR COATING AN ELECTROMAGNETIC COIL

BACKGROUND OF THE INVENTION

This invention relates generally to an apparatus and method for coating an electromagnetic coil with an insulating catalyzed resin material, and more particularly concerns coating the stator coils of an electric motor with an insulating catalyzed resin material at relatively low temperatures.

In the manufacture of electrical motors, particularly three-phase alternating current (a.c.) electric motors, stator coils are wound in and through a laminated iron core to produce a wound stator core. Conventionally, such wound stator cores are coated with a varnish material (i.e., contains a solvent) which insulates the copper wires of the stator coils from each other, from the iron of the stator core, and from the motor housing. In addition, the varnish material mechanically stabilizes the wires in the stator coils by bonding the wires to each other and to the stator core so that vibration of the motor in use does not cause the wires to vibrate and wear through their enamel insulation thereby shorting the stator coils.

Conventionally, the stator coils of a wound stator core are coated with the liquid varnish material such as a solvent thinned thermosetting polyimide, polyester or epoxy material. The wound stator cores are conventionally dipped into a vat containing the varnish material in liquid form. After the entire wound stator core is dipped into the varnish material in the vat, the wound stator cores are removed and baked at temperatures above 300° F. in order to dissipate the solvents and to cure the varnish material. Typically, the wound stator core must be dipped and baked multiple times in order to provide sufficient build up of varnish material to insure proper insulation and mechanical stabilization of the wires in the stator coils.

The conventional method of coating stator coils of a wound stator core by dipping and baking has several interrelated drawbacks. The baking process is at a very high temperature, typically in excess of 300° F., and for a long enough period of time so that the whole wound stator core reaches the full baking temperature. Consequently, after the last baking cycle, the wound stator cores must be left to cool before further assembly involving the wound stator core can be undertaken. The dipping and baking process produces a coating that is generally uniform in thickness on all exposed surfaces including the internal surfaces of the laminated iron stator core. The dipping and baking process, however, does not allow for differential build up of cured varnish material in critical areas of the wound stator coil such as the surfaces adjacent to the sharp edges of the slots in the stator core.

As noted above, the conventional dipping and baking process results in a fully cured coating of varnish material on all exposed surfaces including the inside of the laminated iron stator core. Because of the close tolerances between the inside diameter of the iron stator core and the outside diameter of the motor's rotor, it is necessary to remove the varnish material from the inside of the stator core by manually brushing and scraping the varnish material from the inside of the laminated iron stator core. The result of such brushing and scraping is a dust comprised of fine particles of the varnish material which dust produces a health and environmental hazard requiring special protective clothing and venting procedures. Baking the varnish material also drives off volatile organic compounds which create an additional health and environmental hazard. In order to cope with such health and environmental hazards, it is necessary for the dipping and baking to be done in a special, isolated facility away from the rest of the electric motor assembly line. The necessity of a special off-line facility for dipping and baking results in the use of an off-line, batch process for coating. The special, isolated off-line facility to cope with the environmental hazards necessarily increases the cost of production of the electric motors.

SUMMARY OF THE INVENTION

It is therefore an object of the present invention to provide an apparatus and method for coating an electromagnetic coil, particularly the stator coils of electric motors, with a solvent-free insulating catalyzed resin material at relatively low temperatures as compared to the temperatures required for the conventional dipping and baking method for coating stator coils with a varnish material.

More particularly, it is an object of the present invention to provide an apparatus and method for coating an electromagnetic coil with an insulating catalyzed resin material which apparatus and method do not produce volatile organic compounds or hazardous dust.

It is also an object of the present invention to provide an apparatus and method for coating an electromagnetic coil with an insulating catalyzed resin material which apparatus and method can be used in an on-line continuous process without the need for special handling of the materials used in the coating process.

It is likewise an object of the present invention to provide an apparatus and method for coating an electromagnetic coil with an insulating catalyzed resin material which apparatus and method coats the stator coils of a wound stator core and returns the coated stator core to the assembly line in no more than about 20 minutes for large wound stator cores and in no more than six minutes for small wound stator cores.

It is further an object of the present invention to provide an apparatus and method for coating an electromagnetic coil with an insulating catalyzed resin material which apparatus and method are controllable to build up catalyzed resin material in selected areas of the coils, insulation and iron core assembly.

It is another object of the present invention to provide an apparatus and method for coating an electromagnetic coil with an insulating catalyzed resin material which apparatus and method dispense the catalyzed resin material onto the coil by means of a nozzle, and the amount of catalyzed resin material dispensed is determined based on the volume of the voids within the coil to be filled with catalyzed resin material.

A further object of the present invention is to provide an apparatus and method for coating an electromagnetic coil with an insulating catalyzed resin material, wherein the coated coil exhibits improved bond strength between the insulating catalyzed resin material and the copper wires of the coil and wherein the coated coil has improved resistance to moisture, chemicals and other contaminates.

The foregoing objectives are achieved by an apparatus and method in which the electromagnetic coils, particularly stator coils, are coated with a catalyzed resin material that is a two-part system comprising an epoxy resin and a catalyst. At room temperature, the catalyzed resin material is a viscous liquid and in thin films does not cure rapidly. At a first elevated and maintained temperature (about 140° F.), the catalyzed resin material is a free flowing liquid. At a second elevated and maintained temperature (about 170° F.), the catalyzed resin material begins to rapidly cure and to produce heat (exothermic) which further assists the curing of the catalyzed resin material.

The epoxy resin is heated to approximately the first temperature, and the resin and the catalyst are delivered separately to a mixing, dispensing nozzle or nozzles located above the wound stator core to be coated. The stator coils are preheated to the first temperature by an electric current in the stator coils. Once the stator coils have reached the first temperature, the nozzles begin dispensing a predetermined volume of the catalyzed resin material, as a free flowing liquid, onto the stator coils of the wound stator core. During dispensing of the liquid catalyzed resin material, the wound stator core is moved with respect to the dispensing nozzles to insure the liquid catalyzed resin material is uniformly applied to the stator coils. As the liquid catalyzed resin material is dispensed onto the stator coils, the liquid catalyzed resin material wicks and flows through the stator coils to penetrate and fill the interstices of the stator coils. Once the appropriate volume of liquid catalyzed resin material has been dispensed by the nozzles, a dwell time may be provided in order to insure that the liquid catalyzed resin material has penetrated throughout the stator coils.

After the dwell time, if any, has expired, the current in the stator coils is increased in order to raise the temperature of the stator coils to the second temperature at which the catalyzed resin material begins to rapidly cure (i.e., harden). Once the curing has begun, the catalyzed resin material becomes extremely viscous. The curing process is exothermic which further increases the temperature of the stator coils and drives the curing of the catalyzed resin material. When the stator coils reach a third predetermined temperature (about 215° F.), current is shut off to the stator coils, and the wound stator core is left to finish curing as a result of the exothermic heat produced by the curing itself.

The apparatus and method of the present invention have substantial advantages over the prior art dip and bake method of coating stator coils with a varnish material. Because of the structure of the wound stator core and because the temperatures are relatively low compared to baking, the coated and cured wound stator core can be handled manually immediately after the current is shut off to the stator coils. By self heating the stator coils, the stator core of iron with its high mass does not heat up as rapidly as the copper wires, and after the current is shut off to the stator coils, the copper wires protruding from the stator core act as radiators to dissipate the heat rapidly into the atmosphere.

In addition, the liquid catalyzed resin material used in this invention produces no volatile organic compounds during curing. Also, because the stator core of iron does not reach the curing temperature of the liquid catalyzed resin material during the coating process, any liquid catalyzed resin material that is spilled onto the inside of the stator core can simply be wiped up without any special handling or precautions. Because there are no special environmental precautions necessary, there is no need to isolate the coating apparatus or process from the assembly line. Consequently the coating process of the present invention can be performed continuously and on-line.

Because the nozzles and the wound stator core are movable relative to each other, liquid catalyzed resin material can be placed where desired to provide thicker coating in one area and thinner coating in another area. By varying the volume of liquid catalyzed resin material dispensed, by varying the amount of time that the liquid catalyzed resin material is dispensed, and by varying the location of the dispensing of the liquid catalyzed resin material, the coating of the stator coils can be customized for optimum coating.

In that same regard, one can appreciate that such a process lends itself to computer control. By simply reprogramming or changing parameters of the computer control, the process can be adapted to an infinite number of wound stator core designs and other electromagnetic coil designs.

Other objects and advantages of the invention will become apparent upon reading the following detailed description and upon reference to the drawings.

DETAILED DESCRIPTION OF THE INVENTION

While the invention will be described in connection with a preferred embodiment and method, it will be understood that we do not intend to limit the invention to that embodiment or method. On the contrary, we intend to cover all alternatives, modifications and equivalents as may be included within the spirit and scope of the invention as defined by the appended claims.

Figure 1:
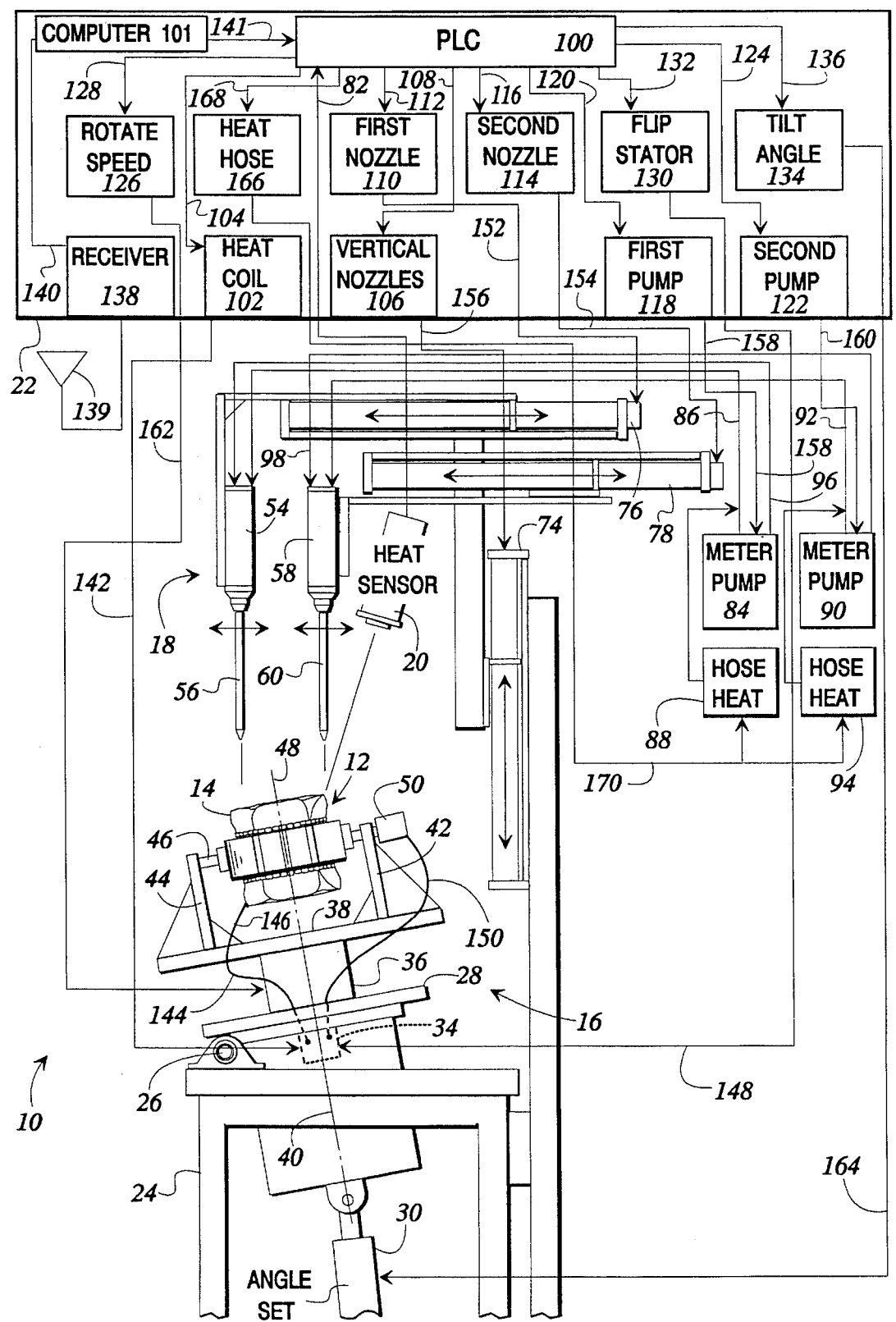
FIG. 1 is a schematic diagram showing an apparatus for coating the stator coils of a wound stator core with an insulating catalyzed resin material in accordance with the present invention.
Figure 5:
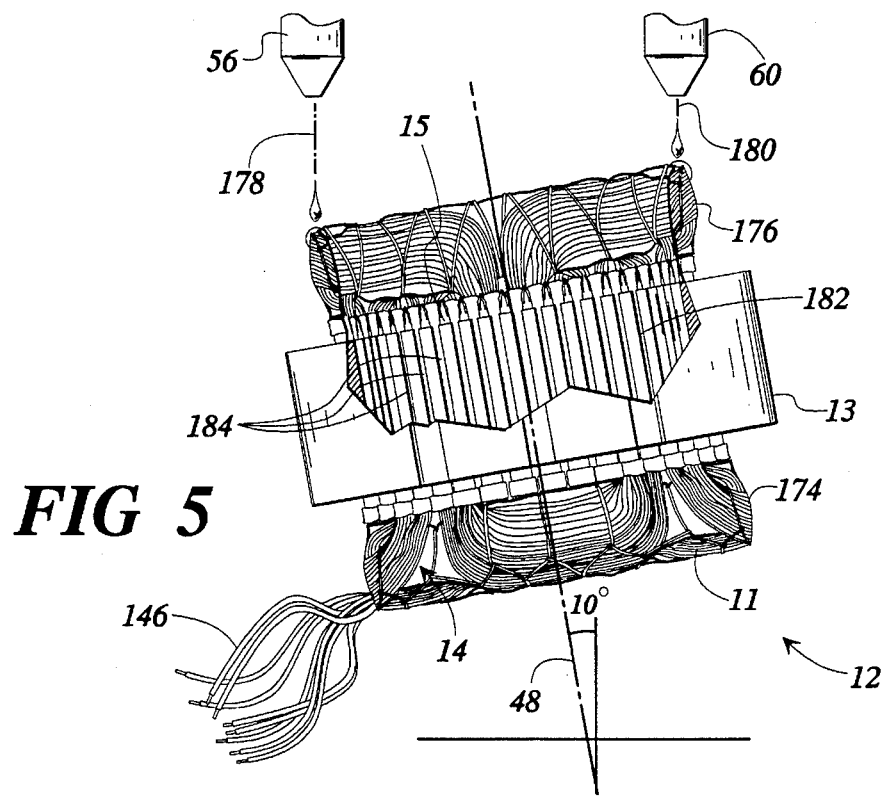
FIGS. 5,6,7,8,9,10,11 show the relative orientations between the nozzles for dispensing the catalyzed resin material and the stator coils of the wound stator core throughout the coating process.

Turning to FIG. 1, there is shown a coating apparatus 10 for coating the stator coils 14 of a wound stator core 12 with an insulating catalyzed resin material in accordance with the present invention. FIG. 5 shows the details of the wound stator core 12. Particularly, the wound stator core 12 has a geometric axis 48 and comprises a laminated iron core 13 and stator coils 14. The iron core 13 has a series of internal axially extending slots 184. Each slot 184 is lined with an insulating paper which protrudes axially from both ends of the iron core 13. The areas between the slots and the protruding insulating paper are called windows 15. Copper wires 11 are wound through the slots to form the stator coils 14. The stator coils 14 protrude axially from both ends of the iron core 13 to form bottom coil heads 174 and top coil heads 176. Lead wires 146 are connected to the stator coils 14 and extend from the bottom coil heads 174. Insulating paper, referred to as a top stick 182, is laid into each slot on top of the stator coils 14.

Returning to FIGS. 1 and 2, the coating apparatus 10 comprises a fixture 16 for supporting the wound stator core 12, a catalyzed resin material delivery system 18 for dispensing liquid catalyzed resin material onto the stator coils 14 of the wound stator core 12, a heat sensor 20 for determining the temperature of the stator coils 14 and a controller 22 for controlling the process for coating the stator coils 14 of the wound stator core 12 with the insulating catalyzed resin material.

Figure 2:
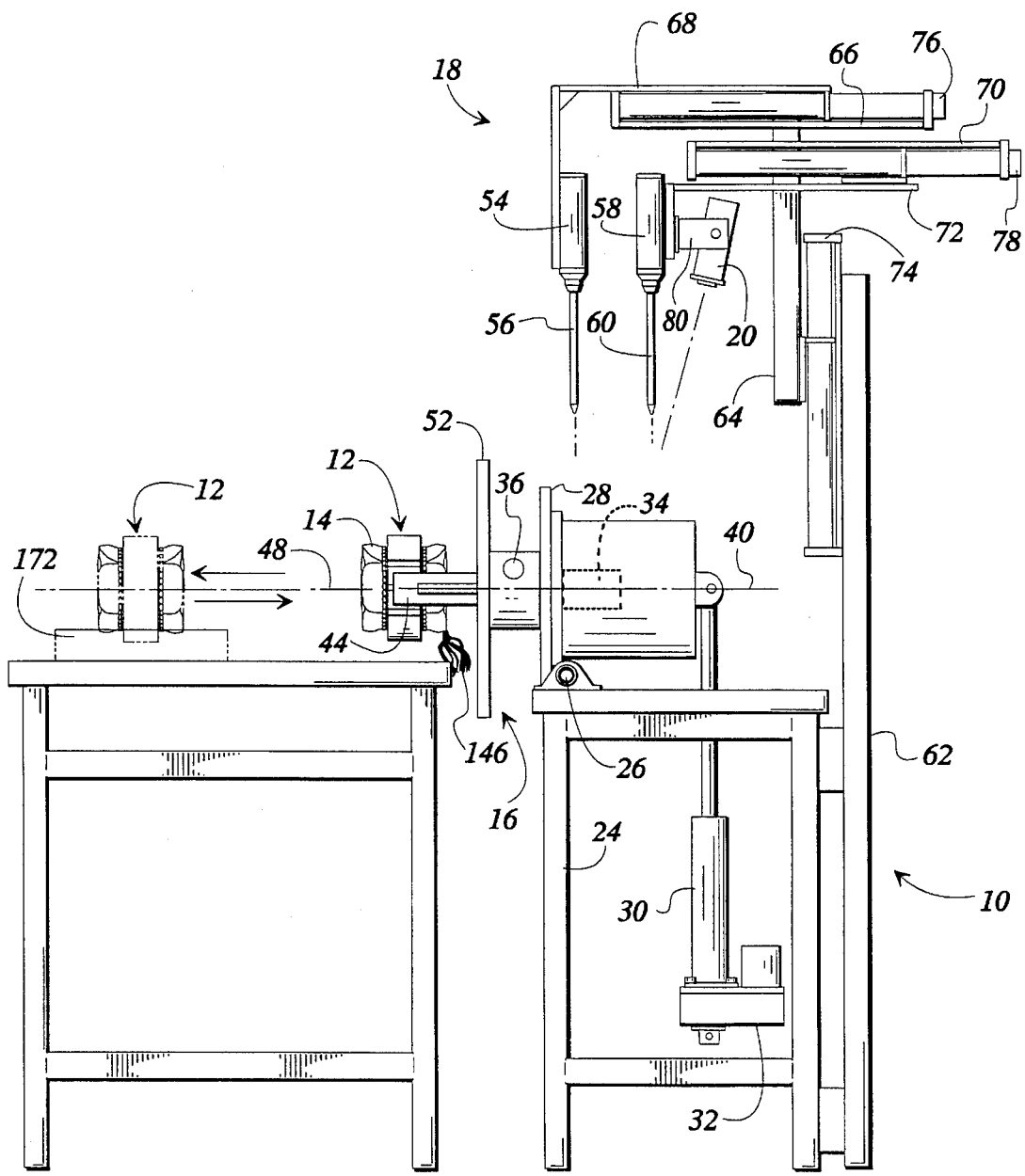
FIG. 2 is a side elevation view of an apparatus for coating the stator coils of a wound stator core with an insulating catalyzed resin material with the apparatus shown in an initial core loading position and a final core unloading position.
Figure 3:
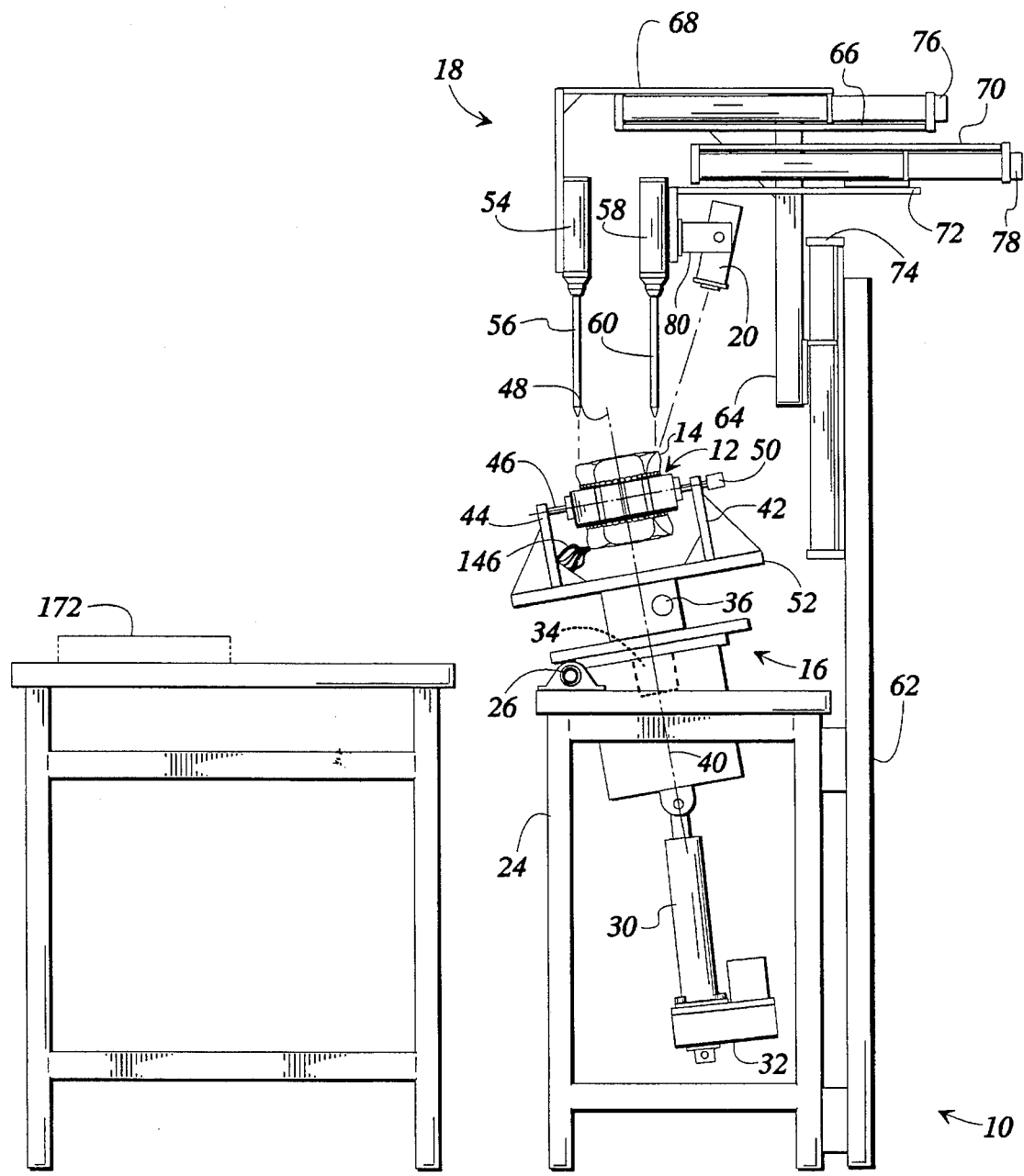
FIG. 3 shows the apparatus of FIG. 2 in a first coating position with the axis of the wound stator core tilted at a first angle of approximately 10 degrees from vertical.
Figure 4:
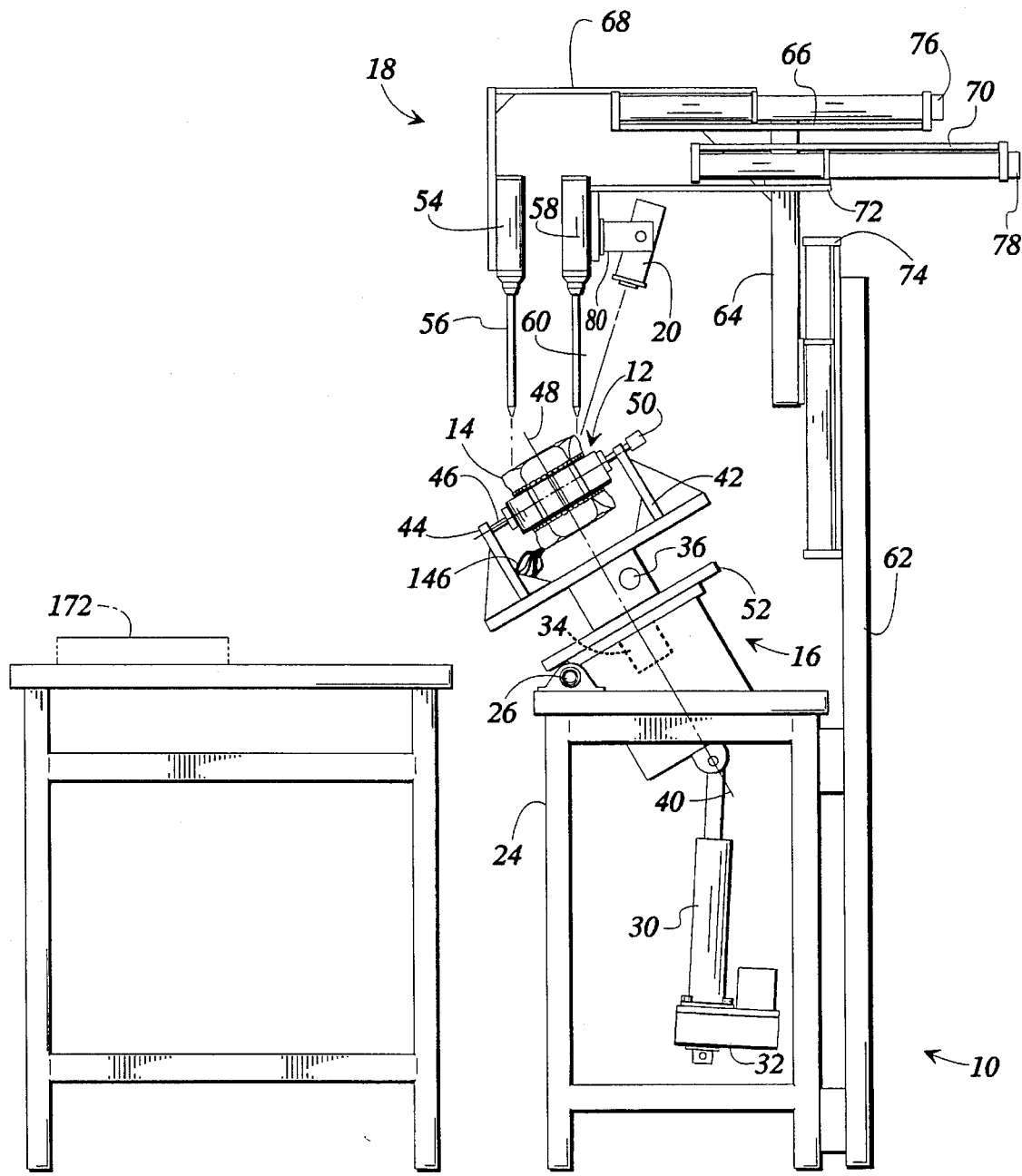
FIG. 4 shows the same apparatus as FIG. 2 in a second coating position with the axis of the wound stator core tilted at a second angle of approximately 30 degrees from vertical.

With continuing reference to FIG. 1 and FIG. 2, the support fixture 16 comprises a support table 24 on which is mounted a tilt table 28 by means of pivot bearing 26. The tilt table 28 can be tilted from a horizontal position (axis 40 is horizontal) shown in FIG. 2 to tilted positions shown in FIGS. 3 and 4 by means of tilt cylinder 30 pivotally anchored to support member 32 of the support table 24. The tilt table 28 carries slip rings 34 and rotation drive 36. The rotation drive 36 is connected to core support yoke 38 which rotates about axis 40 of the rotation drive 36. The yoke has arms 42 and 44, and a pivoting clamp 46 is mounted at the ends of arms 42 and 44. The pivoting clamp 46 is adapted to clamp the wound stator core 12 to the yoke 38. When the wound stator core 12 is clamped by means of pivoting clamp 46 to the core support yoke 38, the axis 48 of the wound stator core 12 is in alignment with the axis 40 of the rotation drive 36. The pivoting clamp 46 also includes a clamp drive 50 which flips the wound stator core 12 end for end in the yoke 38. A drip shield 52, which is located below and affixed to the yoke 38, catches any liquid catalyzed resin material that may drip from the wound stator core 12 during the coating process.

The catalyzed resin material delivery system 18 comprises a first mixing head 54 with a first nozzle 56 and a second mixing head 58 with a second nozzle 60. Turning to FIG. 2, the mixing heads 54 and 58 are mounted to the support table 24 by means of a fixed vertical support 62, movable vertical support 64, fixed first horizontal support 66 and movable first horizontal support 68 for first mixing head 54 and fixed second horizontal support 70 and movable second horizontal support 72 for second mixing head 58. Vertical lead screw drive 74 raises and lowers movable vertical support 64 to thereby raise and lower the mixing heads 54 and 58. First horizontal lead screw drive 76 moves movable first horizontal support 68 horizontally to thereby position the first mixing head 54 and dispensing nozzle 56. Likewise, second horizontal lead screw drive 78 moves movable second horizontal support 72 horizontally to position mixing head 58 and dispensing nozzle 60.

In addition, an infrared heat sensor 20 is connected to second mixing head 58 by means of bracket 80. The infrared heat sensor 20 is of conventional design and commercially available. The heat sensor 20 remotely senses the temperature of the stator coils 14 of the wound stator core 12 and provides an electric signal indicating the temperature to controller 22 via feedback line 82 (FIG. 1).

Referring to FIG. 1, the catalyzed resin material delivery system 18 also includes a first metering pump system 84 which pumps the resin and catalyst components of the catalyzed resin material from supply reservoirs (not shown) to the mixing head 54 by means of first heated hose 86 for the resin and first catalyst hose 96 for the catalyst. The first heated hose 86 is heated by first heat source 88. Likewise, second metering pump system 90 pumps the resin and catalyst components of the catalyzed resin material from supply reservoirs (not shown) to the mixing head 58 by means of second heated hose 92 for the resin and second catalyst hose 98 for the catalyst. The second heated hose 92 is heated by second heat source 94. The catalyst and the resin are mixed by the static mixing heads 54 and 58. The flow rate of resin and catalyst at the mixing heads 54 and 58 is controlled by controller 22 via control lines 158 and 160 to the metering pump systems 84 and 90 respectively. The flow rate of resin and catalyst may be varied as required by the coating process. The flow rate is controlled with the speed of drive motors (not shown) used in the metering pump systems to drive gear pumps with preset gearing (not shown). The ratio of resin to catalyst is determined by the preset gearing of the gear pumps in the metering pump systems 84 and 90. The pumps used in the metering pump systems are available from Zenith Division of Parker Hannifin Corporation of Waltham, Mass. and the pump drive motors are available from Reliance Electric Industrial Company of Cleveland, Ohio, the assignee of the present invention. For the catalyzed resin material used in connection with the present invention and described in greater detail below, the preferred ratio of resin to catalyst is 100:7. In connection with the present invention, other ratios of resin to catalyst may be used.

The controller 22 comprises a general purpose digital computer 101 and a programmable logic controller (PLC) 100 which through its :analog and digital input/output interface controls the operation of the coating apparatus 10. Particularly, PLC 100 (available from Reliance Electric Industrial Company of Cleveland, Ohio, the assignee of the present invention) controls heat coil module 102 via line 104, nozzles vertical module 106 via line 108, first nozzle horizontal module 110 via line 112, second nozzle horizontal module 114 via line 116, first pump module 118 via line 120, second pump module 122 via line 124, rotate speed module 126 via line 128, stator core flip module 130 via line 132, tilt module 134 via line 136, and heat hose module 166 via line 168. In addition, the PLC 100 receives temperature information via feedback line 82 from heat sensor 20. Each wound stator core 12 has a microchip tag attached to it which contains data relating to various parameters of the wound stator core such as frame size, dimensions, number of slots, wire size and number of wires in a slot, and other information about the wound stator core 12. The information on the microchip is transmitted by a transmitter (not shown) and received by receiver 138 via antenna 139. Computer 101 receives that data about the wound stator core 12 from the receiver 138 via line 140.

Under the control of PLC 100, each of the modules provides control signals to the coating apparatus 10 to control the process. Particularly, heat module 102 provides current to the slip rings 34 via lines 142. From the slip rings 34, the current in lines 142 is connected to lines 144 which in turn are connected to leads 146 of the stator coils 14. In that manner and on instructions from the PLC 100, current is supplied to the stator coils 14 via leads 146 in order to heat the stator coils 14.

In addition, when the PLC 100 instructs stator core flip module 130 to flip the wound stator core end for end, the stator flip module 130 sends a control signal on lines 148, which is connected through slip rings 34 via lines 150 to clamp drive motor 50. The signal from the stator core flip module 130 causes the clamp drive motor 50 to flip the wound stator core end for end within the support yoke 38.

The PLC 100 also controls the vertical and horizontal positions of the nozzles 56 and 60 by means of first nozzle horizontal module 110, second nozzle horizontal module 114 and nozzle vertical module 106. First nozzle horizontal module 110 is connected to first horizontal lead screw drive 76 by means of control line 152. Likewise, second nozzle horizontal module 114 is connected to a second horizontal lead screw drive 78 via control line 154. Nozzle vertical module 106 is connected to vertical lead screw drive 74 via control line 156. Control signals on the control lines 152, 154, and 156 position the nozzles 56 and 60 in a common vertical position and in individual horizontal positions. The PLC 100 controls first metering pump system 84 by means of control signals on control line 158 from first pump module 118. Likewise, the PLC 100 controls second metering pump system 90 by means of control signals on control line 160 from second pump module 122.

The rotation drive 36 is controlled by rotate speed module 126 via control line 162, and the tilt cylinder 30 is controlled by tilt angle module 134 via control line 164.

In accordance with the present invention for coating the stator coils 14 of the wound stator core 12 with an insulating catalyzed resin material, it is necessary first to determine several operating parameters for the coating process. Particularly, it is necessary to select a catalyzed resin material that can be poured at a relatively low temperature and will stay in liquid form for a sufficient period of time in order to penetrate the stator coils before curing begins. Preferably, the catalyzed resin material used for coating stator coils 14 in accordance with the present invention is a two-part system, one component is an epoxy resin and the other component is a catalyst which assists the curing of the epoxy resin. The preferred resin component is a modified diglyceride ether resin of bisphenol A, which is available from Reliance Electric Industrial Company of Cleveland, Ohio, under the Specification No. 48241GB. The preferred catalyst is a liquid chemically-modified amine complex of boron trifluoride, which is available from Reliance Electric Industrial Company of Cleveland, Ohio, under Specification No. 48241GC. Other catalyzed resin materials having similar characteristics can be used.

The resin and catalyst are kept separate from each other until they are mixed together in the mixing heads 54 and 58 just prior to dispensing of the catalyzed resin material onto the stator coils. As previously stated, we have found that the preferred ratio of resin to catalyst is 100:7 although other ratios are useful in connection with the present invention.

At a first temperature of about 140° F., the selected catalyzed resin material is a free flowing liquid having a viscosity of less than 1000 centipoises (cps) and preferably less than 200 cps. As a free flowing liquid at a moderate temperature of about 140° F., the catalyzed resin material can be freely dispensed onto the stator coils, can run along the coils and can penetrate the coils through wicking and the effects of gravity. Also at the first temperature of about 140° F., the catalyst is not highly activated and curing occurs only at a very slow rate thus giving sufficient time to dispense the catalyzed resin material and allow it to penetrate the stator coils of the wound stator core.

In connection with the selected catalyzed resin material used with the present invention, heating the catalyzed resin material to a second temperature of about 170° F. triggers the catalyst and curing begins to proceed at a rapid rate. Curing of the catalyzed resin material is an exothermic reaction. Therefore, once the curing has been started by heating the stator coils to about 170° F., the heat produced by the curing process accelerates and assists the curing to run to completion without the necessity of supplying additional heat to the catalyzed resin material.

In addition to the working characteristics of the catalyzed resin material, the process for dispensing the catalyzed resin material onto the stator coils may be customized to work with a variety of different wound stator cores for different motor designs. In that regard, the volume, flow rate and placement of the liquid catalyzed resin material dispensed onto the stator coils is determined through calculations done by computer 101. The volume of catalyzed resin material is determined by calculating the total volume of voids within the stator coils for each particular wound stator core design. Particularly, computer 101 is loaded with a table (Table 2 below) which contains a number of factors that describe the physical characteristics of the wound stator core. The factors are identified in Table 1 and include:

TABLE 1

| Factor | Dimensions | Description Of Factors For Catalyzed resin Calculations |
| --- | --- | --- |
| K2 | inches | Straight portion of coil extending from core to coil bend |
| K1 | inches | Distance from core to tip of coil |
| GD | inches | Gap diameter—diameter of inside of stator core |
| P1 | — | Multiplication factor (based on percent of coil head copper volume) |
| P2 | — | Multiplication factor (based on percent of slot copper) |
| P3 | revs. | Number of revolutions required to pour connection end |
| P5 | — | Factor to determine portion of cycle before jog in second stator position for nozzle #1 |
| P6 | — | Factor to determine portion of cycle before jog in second stator position for nozzle #2 |
| P7 | seconds | Time before jog in second stator position for nozzle 1 |
| P8 | seconds | Time before jog in second stator position for nozzle 2 |
| Z1 | seconds | Total pour time of nozzle 1 in third stator position |
| Z2 | seconds | Total pour time of nozzle 2 in third stator position |
| WA | cc | Estimated amount required for inside and back of coil heads |
| T1 | seconds | Minimum time before stator moves from position 1 |

Table 2 below provides typical values for the above identified factors, for example a 2-pole 180 motor frame. The term "180 frame" relates to the size of the motor and is in accordance with standard practice of the National Electrical Manufacturers Association (NEMA).

TABLE 2

| 2 POLE 180 FRAME | |
| --- | --- |
| K1 | 1.12 |
| K2 | .6 |
| GD | 4.125 |
| P1 | .4 |
| P2 | .25 |
| P3 | 13 |
| P5 | 1 |
| P6 | 1 |
| P7 | 30 |
| P8 | 18 |
| Z1 | 36 |
| Z2 | 42 |
| WA | 20 |
| T1 | 24 |

From Table 2 contained in the computer 101 and from additional parameters on a microchip attached to the wound stator core which parameters are read by receiver 138 and loaded into the computer 101, the computer 101 can calculate the volume of catalyzed resin material required. Particularly, the information from the microchip attached to the wound stator core includes frame size, the core length (CL), the slot depth (SD), the number of conductor wires in a slot multiplied by the diameter squared of each conductor in a slot (ND²), the number of slots (no. slots), and the span between slots (SP). From the information read from the microchip and from the factors in the computers memory (Table 2), the amount of catalyzed resin material required for a particular wound stator core can be calculated as follows:

Total volume (TV)=coil head volume+slot volume+window volume.

In order to calculate total volume, the computer 101 first calculates the mean length of the conductor wire in the coil heads (MLC):

MLC=K1*3.14*(GD+(SD/2))*(SP+1)/no. slots.

From the mean length of conductor (MLC), the volume required for the coil heads is calculated as follows:

Coil head volume=MLC*no. slots*16.39*ND²*P1.

The value "16.39" is a conversion factor to convert the result to cubic centimeters (cc).

The calculation of the amount of catalyzed resin material required in the slots is calculated as follows:

Slot volume=(CL+K2)*ND²*no. slots*16.39*P2.

The amount of catalyzed resin material required to coat the window areas between the stator coils in the coil heads is determined based on experimentation and relates to the frame size. An example of the window volume is as follows:

180 frame size=40 cc

Having determined the amount of catalyzed resin material required for a particular wound stator core, the computer 101 next calculates the flow times for dispensing at various positions of nozzle placement. The flow rates (FR) are based on frame size and are stated in cc/revolution of the wound stator core at ten revolutions per minute. An example is:

180 frame size=5 cc/rev

Through experimentation, it has been determined that ten revolutions per minute using two dispensing nozzles offset from each other by 180 degrees is preferred. The speed of revolution, however, could vary from about five revolutions per minute for two nozzles to about 15 revolutions per minute or higher for a two nozzle system.

In order to determine the dwell time for the nozzles at each dispensing position or jog of the nozzles during pouring, the computer 101 calculates the number of revolutions (X) at 10 revolutions per minute required for the various dispensing positions of the nozzles:

X=((TV/FR)–P3)/4 at 10 revolutions per minute

From the number of revolutions (X), the computer can calculate the dwell time (J1) for the first nozzle and the dwell time (J2) and for the second nozzle during the first pour of catalyzed resin material with the wound stator core in the position shown in FIG. 5 before a jog. The dwell time for the nozzles at the position shown in FIG. 5 before a jog is:

J1=((X*P5) rounded to whole number)*6

J2=((X*P6) rounded to a whole number)*6

In this case, P5 and P6 are "1" so there is no jog and J1 and J2 are both equal to "A" where:

A=(X rounded to whole number)*6

Therefore, for the first pour with the wound stator core and nozzles in the positions shown in FIG. 5, the nozzles pour for a dwell time of A=J1=J2.

Figure 6:
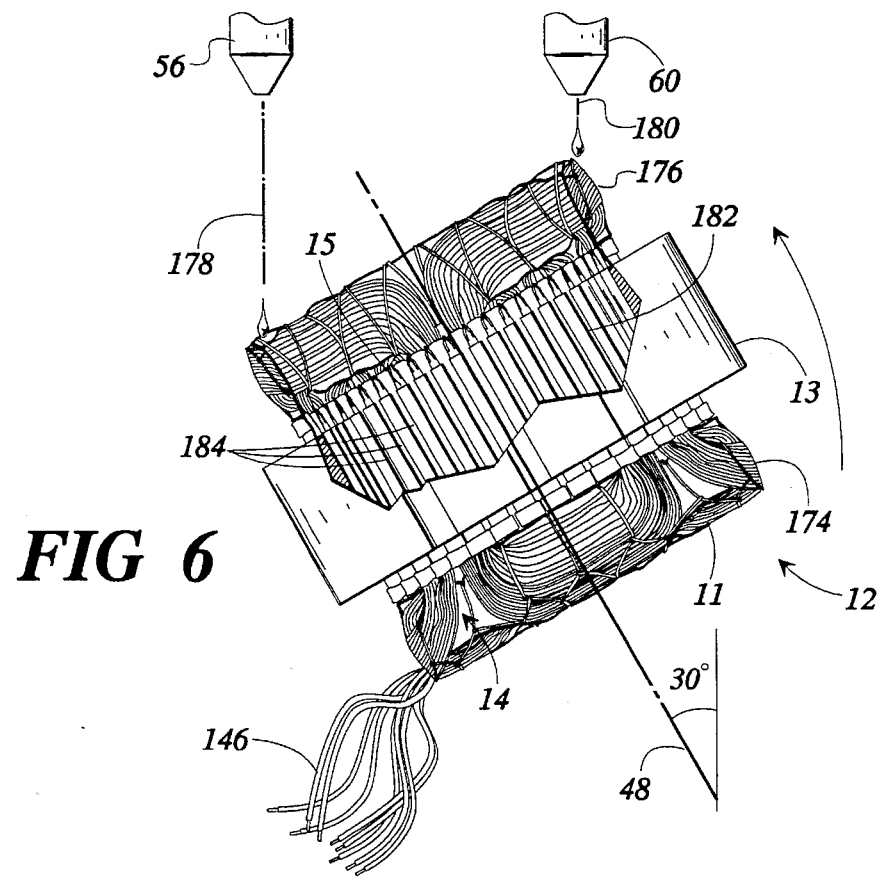
Figure 7:
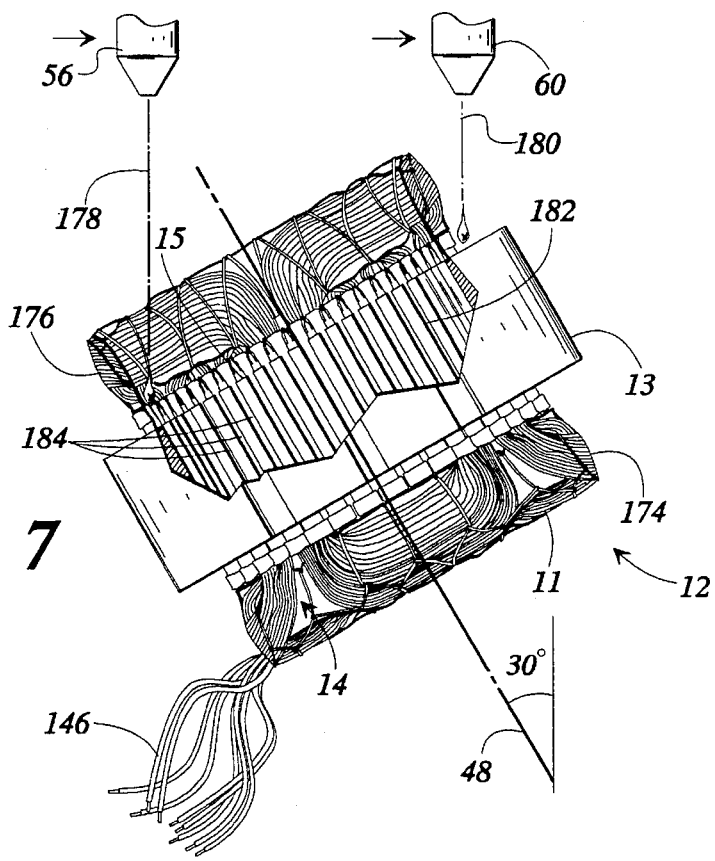
Figure 8:
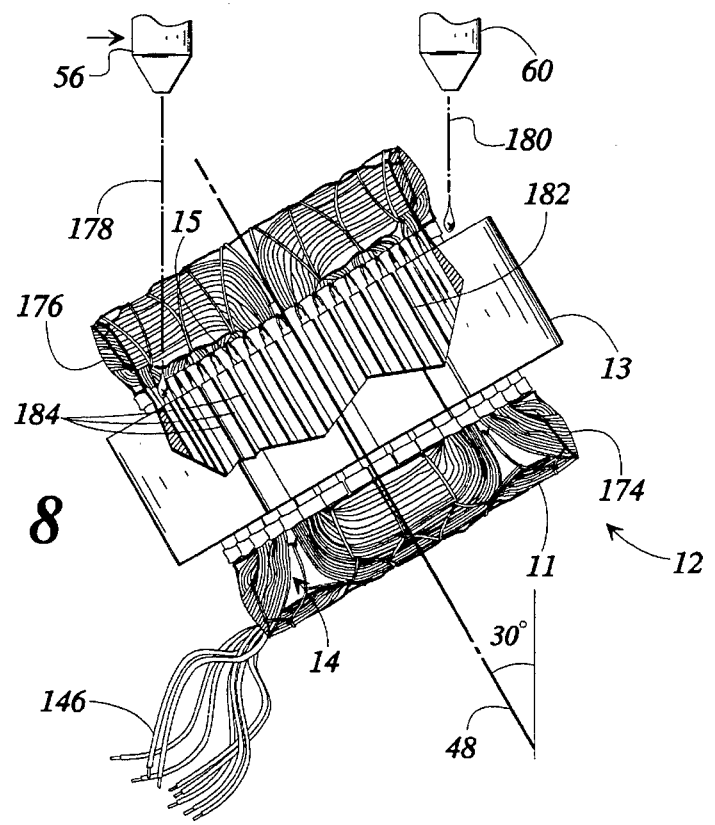

For the second pour with the wound stator core in the position shown in FIGS. 6–8, the dwell times until each jog of the nozzles are:

|                   | Total Dwell | 1st Dwell | 2nd Dwell |
| --- | --- | --- | --- |
| First nozzle (56) | A | J3 | J9 |
| Second nozzle (60) | A | J4 | |

(Where J3 = A – P7; J4 = A – P8; and J9 = 12.)

Figure 9:
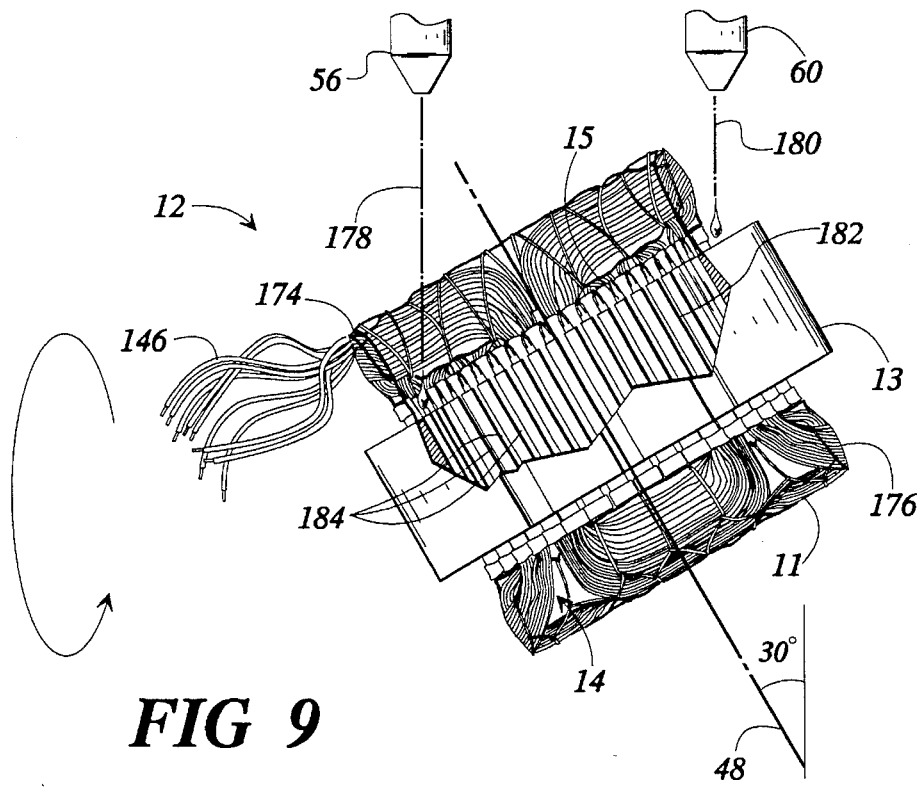
Figure 10:
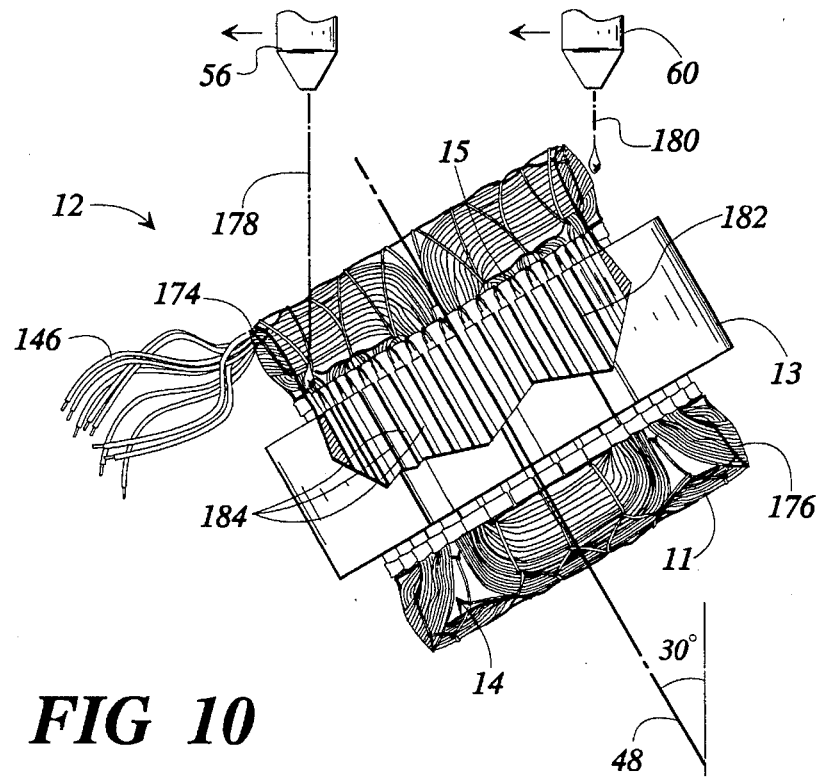
Figure 11:
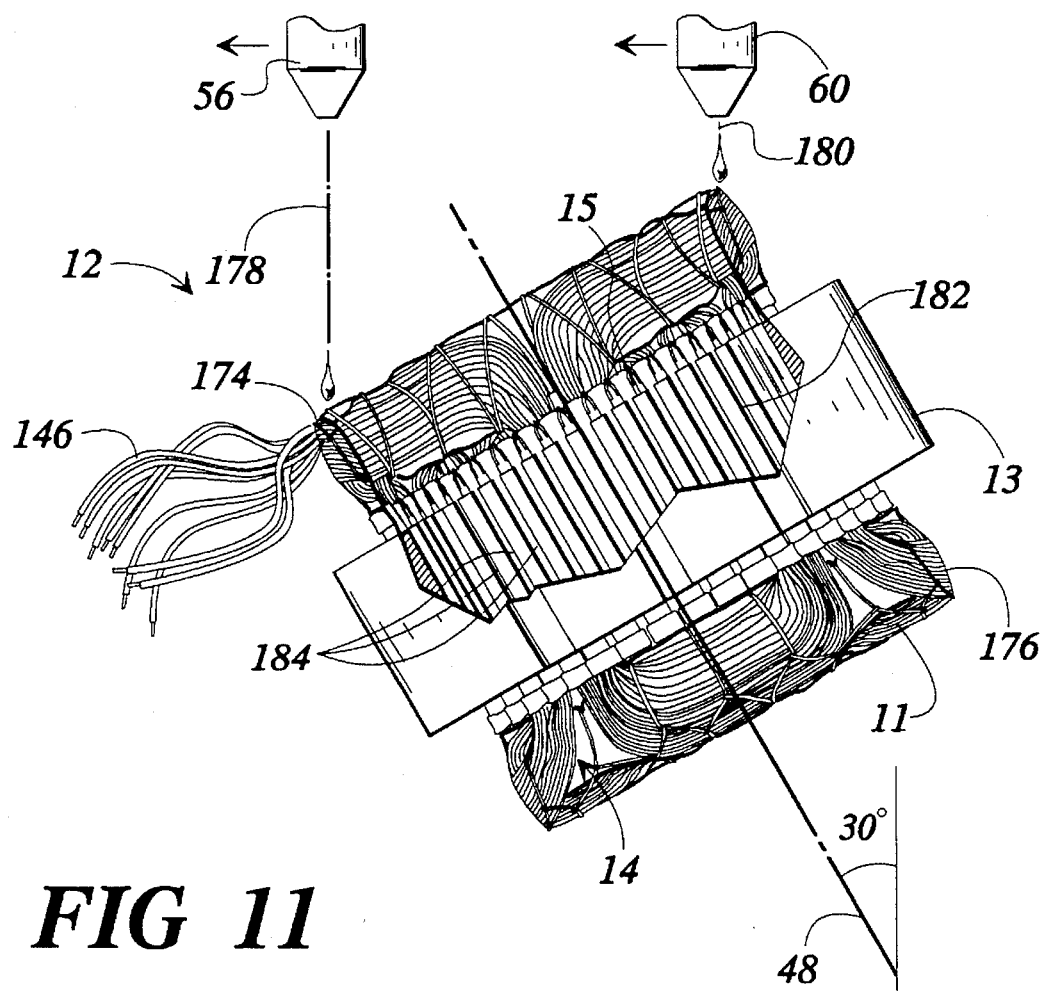

For the third pour with the stator core in the position shown in FIGS. 9–11, the dwell times until each jog of the nozzles are:

|                   | Total Dwell | 1st Dwell | 2nd Dwell |
| --- | --- | --- | --- |
| First nozzle (56) | Z1 | J5 | J7 |
| Second nozzle (60) | Z2 | J6 | J8 |

(Where J5 = 12; J6 = 12; J7 = 12; and J8 = 18.)

As will be seen in connection with a detailed description of the operation of coating apparatus 10, the results of the calculations are transmitted from computer 101 to the PLC 100 so that the PLC 100 can order the coating apparatus 10 to dispense the appropriate amount of catalyzed resin material for each position of the nozzles during the coating process.

The coating process in accordance with the present invention is best understood with reference to FIGS. 1, 2, 3 and 4. The wound stator core 12 shown in phantom in FIG. 2 is loaded from a pallet 172 onto the core support yoke 38. The axis 48 of the wound stator core 12 is horizontal during the loading step. Once the wound stator core 12 has been secured to the pivoting clamp 46 of the yoke 38, the tilt cylinder 30 is activated by PLC 100 to bring the wound stator core 12 into the position shown in FIGS. 3 and 5, and the PLC 100 instructs the rotate speed module 126 to start the rotation of the yoke 38 and the wound stator core 12. Particularly, the axis 48 of the stator core 12 is tilted at an angle of about 10 degrees from vertical although angles ranging from 5 degrees to 15 degrees are considered acceptable.

Prior to and during the loading of the wound stator core onto the support yoke 38, the computer 101 calculates the volume of catalyzed resin material and the dwell times as previously explained and transmits the results to the PLC 100 via line 141. In addition, the resin delivery hoses 86 and 92 have been preheated to the first temperature of about 140° F.

With the wound stator core 12 oriented as shown in FIG. 5 with the leads 146 extending from the bottom coil heads 174, nozzles 56 and 60 are lowered toward the wound stator core by means of vertical lead screw drive 74. Nozzle 56 is horizontally aligned by horizontal lead screw drive 76 so that when the catalyzed resin material stream 178 is dispensed, the catalyzed resin material will contact the top coil heads 176 approximately in the center of the coil heads measured axially from the axis 48. Likewise, nozzle 60 is horizontally aligned by horizontal lead screw drive 78 so that when the catalyzed resin material stream 180 is dispensed, the catalyzed resin material will contact the top coil heads 176 approximately in the center of the coil heads measured axially from the axis 48.

With the nozzles 56 and 60 aligned as shown in FIG. 5 and the wound stator core rotating about its axis 48, the PLC 100 directs the heat core module 102 to apply alternating current with a frequency of 25–50 hertz (Hz) through the slip rings 34 to the stator coils 14 in order to heat them to the first temperature (about 140° F.). The alternating current induces vibration in the coils which promotes migration of the catalyzed resin material into the interstices of the stator coils. The frequency of the alternating current is selected to promote migration without vibrating the catalyzed resin material off of the stator coils.

The heat sensor 20 monitors the temperature of the coil heads 176, and when the first temperature of about 140° F. is reached, the PLC 100 activates metering pump systems 84 and 90 which begin pumping resin and catalyst to nozzles 56 and 60 respectively for the first pouring sequence. In addition, the PLC 100 causes the heat core module 102 to maintain the current at a level of current in the stator coils 14 required to maintain the first temperature while the catalyzed resin material is being dispensed from the nozzles 56 and 60.

After the predetermined dwell time (J1=J2=A) has elapsed, during which the nozzles 56 and 60 dispense catalyzed resin material onto the center of the coil heads 176 of the stator coils as shown in FIG. 5, the PLC 100 causes the metering pump systems 84 and 90 to stop, and the mixing heads 54 and 58 are raised. The PLC 100 then instructs the tilt cylinder 30 to tilt the wound stator core 12 to about 30 degrees from the vertical as shown in FIG. 6. Angles of between about 25 degrees and 35 degrees are considered acceptable. Once the wound stator core 12 has been tilted to the appropriate position, the nozzles 56 and 60 are lowered and aligned to the position shown in FIG. 6 so that the catalyzed resin material stream 178 from nozzle 56 will contact the upper inside corner of the coil heads 176 and the catalyzed resin material stream 180 from nozzle 60 will contact the upper outside corner of the coil heads 176. With nozzle 56 and nozzle 60 aligned as shown in FIG. 6, the PLC 100 instructs the metering pumps 84 and 90 to begin the second pouring sequence by dispensing catalyzed resin material onto the coil heads 176.

After predetermined dwell times (J3 for nozzle 56 and J4 for nozzle 60) have elapsed, nozzles 56 and 60 jog horizontally to the positions shown in FIG. 7. In FIG. 7, the catalyzed resin material stream 178 impacts the coil heads 176 at a point just outboard radially from the edge of the top sticks 182, and the catalyzed resin material stream 180 impacts the top coil heads 176 at a point adjacent where the coil heads 176 enter the iron core 13. The dispensing of the catalyzed resin material continues while the wound stator core rotates about its axis 48.

At the end of a second dwell time (J9 for nozzle 56) calculated by computer 101, nozzle 56 jogs to the position shown in FIG. 8. Nozzle 60 remains in the same position shown in FIG. 7. Nozzle 56 is positioned after the jog so that the catalyzed resin material stream 178 impacts the top sticks 182 just adjacent the top of the iron core 13. In that position, the nozzle 56 provides additional coating in the critical area where the top sticks protrude from slots 184.

Dispensing of the catalyzed resin material continues for another predetermined dwell time (A-J3-J9 for nozzle 56 and A-J4 for nozzle 60) calculated by the computer 101. At the end of the last predetermined dwell time, the PLC 100 instructs the metering pump systems 84 and 90 to stop and instructs the clamp drive motor 50 via tilt angle module 134 to flip the wound stator core 12 end for end so that the bottom coil heads 174, with the leads 146 extending therefrom, are now on top adjacent the nozzles 56 and 60. Once the wound stator core 12 is positioned as shown in FIG. 9, nozzles 56 and 60 are again lowered toward the stator core in the horizontal alignment shown in FIG. 9. In FIG. 9, catalyzed resin material stream 180 will impact the bottom coil heads 174 at a point on the outside of the coil heads 174 adjacent the intersection with the iron core, and the catalyzed resin material stream 178 will impact the top sticks 182 at a point adjacent the iron core. Once the nozzles are aligned as shown in FIG. 9, the PLC 100 initiates the third pouring sequence by instructing the metering pump systems 84 and 90 to resume dispensing the catalyzed resin material through the nozzles 56 and 60.

After the elapse of a predetermined dwell times (J5 for first nozzle 56 and J6 for nozzle 60) calculated by computer 101, nozzles 56 and 60 jog to the positions shown in FIG. 10. In FIG. 10, the catalyzed resin material stream 178 impacts the top of the top sticks, and catalyzed resin material 180 impacts the bottom coil heads 174 at approximately the center of the outside of the bottom coil heads 174.

After the elapse of predetermined dwell times (J7 for first nozzle 56 and J8 for second nozzle 60), the nozzles 56 and 60 jog horizontally to the positions shown in FIG. 11. In FIG. 11, the catalyzed resin material stream 178 impacts the upper inside corner of the bottom coil heads 174, and the catalyzed resin material stream 180 impacts the upper outside corner of the bottom coil heads 174.

After the elapse of predetermined dwell times (Z1-J5-J7 for the first nozzle 56 and Z2-J6-J8 for the second nozzle 60), the PLC 100 stops the metering pump systems 84 and 90, and the flow of catalyzed resin material from nozzles 56 and 60 ceases.

Once the nozzles have been shut off, the PLC 100, depending on the size of the wound stator core being coated, may simply wait while the core head continues to rotate about its axis 48 to assure that the liquid catalyzed resin material has fully penetrated the stator coils. Once the predetermined waiting time, if any, has expired, the PLC 100 instructs the heat core module 102 to provide additional current to the stator coils 14 to increase their temperature from the first dispensing temperature of about 140° F. to the second cure temperature of about 170° F. As the internal heat of the stator coils 14 increases, the crosslinking of the resin is accelerated, and the curing of the catalyzed resin material begins to occur rapidly. Curing of the catalyzed resin material is exothermic, thereby producing additional heat inside the stator coils. As a result, the temperature of the stator coils rises rapidly from 170° F. toward a third temperature of approximately 215° F.

At 215° F., the heat sensor 20 signals the PLC 100 to shut off all current to the stator coils. In addition, the PLC 100 activates the tilt cylinder 30 to bring the wound stator core back to its horizontal position shown in FIG. 2. With the wound stator core 12 in its horizontal position, the PLC 100 instructs the rotation drive 36 to stop, and the wound stator core is unloaded from the support yoke 38.

Because of the high thermal mass of the iron core 13, the high heat conductivity of the copper wire in the stator coils 14 and the relatively low pouring and curing temperatures, the inside surfaces of the iron core do not reach sufficiently high temperature to start the rapid curing of any catalyzed resin material that may have dripped onto the iron core. Consequently, the catalyzed resin material that may have been dripped onto the inside surfaces of the iron core 13 can be wiped from the iron core without the necessity of brushing or scraping. In addition, the iron core remains sufficiently cool that it can be handled by a workman using only ordinary gloves. Once the core has been wiped clean and replaced on the assembly line, it is sufficiently cool that it can be immediately placed inside the motor housing in connection with the next step in the manufacturing process. We have found that the process for coating wound stator cores in connection with the present invention can be carried out on-line and that the time required from the loading of the wound stator core onto the coating apparatus 10 until the wound stator core is returned to the assembly line and ready for further handling and assembly is no more than 20 minutes for large wound stator cores and no more than six minutes for small wound stator cores.

We claim:

1. A method for coating an electromagnetic coil with an insulating catalyzed resin material wherein the viscosity and the curing rate of the catalyzed resin material are affected by heat, the method comprising the steps of:
  a. Supplying current to the coil to heat the coil to a first temperature at which temperature the catalyzed resin material is a free flowing liquid;
  b. Applying the catalyzed resin material as a free flowing liquid to the coil;
  c. Waiting for the catalyzed resin material to penetrate the coil; and
  d. Supplying additional current to the coil to raise the temperature of the coil to a second temperature in order to cure the catalyzed resin material in the coil.

2. The method of claim 1, wherein the method further comprises limiting the current in the coil when the coil reaches a third temperature.

3. The method of claim 1, wherein the steps of supplying current and additional current to the coil comprises:
  a. Supplying alternating current to the coil to cause the coil to vibrate to promote penetration of the catalyzed resin material.

4. The method of claim 1, wherein the method further comprises:
  a. Preheating the catalyzed resin material to approximately the first temperature before applying the catalyzed resin material to the coil.

5. The method of claim 4, wherein the step of heating the coil and the catalyzed resin to the first temperature comprises:
  a. Selecting the temperature so that the catalyzed resin material has a viscosity of less than 1000 centipoises.

6. The method of claim 1, wherein the method further comprises:
  a. Sensing the temperature of the coil and controlling the current supplied to the coil to maintain the coil at the first temperature during dispensing of the catalyzed resin material and to limit the current in the coil when the coil reaches the third temperature.

7. The method of claim 1, wherein the step of applying the catalyzed resin material comprises:
  a. Dispensing the catalyzed resin material by means of a nozzle onto the coil while moving the coil and the nozzle relative to each other to insure the catalyzed resin material is uniformly applied to the coil.

8. The method of claim 7, wherein the step of applying the catalyzed resin material further comprises:
  a. Calculating a volume of voids in the coil and
  b. Dispensing that volume of catalyzed resin material onto the coil.

9. The method of claim 7, wherein the step of waiting for the catalyzed resin material to penetrate the coil comprises:
  a. A first waiting time during which the catalyzed resin material is being dispensed onto the coil and
  b. A second waiting time during which the catalyzed resin material is not being dispensed onto the coil.

10. The method of claim 9, wherein the second waiting time is less than the first waiting time.

11. A method for coating the stator coil of a wound stator core of an electric motor with an insulating catalyzed resin material, wherein the viscosity and the curing rate of the catalyzed resin material is effected by heat and wherein the wound stator core has an axis and includes an iron stator core with slots therein for containing the stator coils and wherein the stator coils protrude axially from both ends of the slots of the iron stator core to form coil heads with interstitial windows between the coil heads, the method comprising the steps of:
  a. Orienting the wound stator core with its axis at a first angle with respect to vertical;
  b. Aligning the nozzle with the coil heads protruding from the stator core:
  c. Rotating the wound stator core about its axis;
  d. Heating the stator coil to a first temperature at which temperature the catalyzed resin material is a free flowing liquid;
  e. Dispensing the catalyzed resin material as a free flowing liquid onto the coil heads by means of a nozzle;
  f. Moving the stator coil and the nozzle relative to each other to insure the catalyzed resin material is uniformly applied to the stator coil including moving the nozzle radially relative to the axis of the wound stator core during dispensing of the catalyzed resin material;
  g. Waiting for the catalyzed resin material to penetrate the stator coil within the slots of the stator core; and
  h. Raising the temperature of the stator coil to a second temperature in order to cure the catalyzed resin material in the stator coil.

12. The method of claim 11, wherein the steps of heating the stator coil to the first temperature and raising the temperature of the stator coil to the second temperature comprise:
  a. Supplying current to the stator coil to heat the stator coil to the first temperature;
  b. Supplying additional current to the stator coil to raise the temperature of the stator coil to the second temperature; and
  c. Limiting the current in the stator coil when the stator coil reaches a third temperature.

13. The method of claim 12, wherein the steps of supplying current and additional current to the stator coil comprises:
  a. Supplying alternating current to the stator coil to cause the stator coil to vibrate to promote penetration of the catalyze resin material.

14. The method of claim 12, wherein the method further comprises:
  a. Preheating the catalyzed resin material to approximately the first temperature before applying it to the stator coil.

15. The method of claim 14, wherein the step of heating the stator coil to the first temperature comprises:
  a. Selecting the temperature so that the catalyzed resin material has a viscosity of less than 1000 centipoises.

16. The method of claim 12, wherein the method further comprises:

a. Sensing the temperature of the stator coil and controlling the current supplied to the stator coil to maintain the stator coil at the first temperature during dispensing of the catalyzed resin material and to limit the current in the stator coil when the stator coil reaches the third temperature.

17. The method of claim 12, wherein the step of applying the catalyzed resin material comprises:

a. Dispensing the catalyzed resin material by means of a nozzle onto the stator coil while moving the stator coil and the nozzle relative to each other to insure the catalyzed resin material is uniformly applied to the stator coil.

18. The method of claim 17, wherein the step of applying the catalyzed resin material further comprises:

a. Calculating a volume of voids in the stator coil and
  b. Dispensing that volume of catalyzed resin material onto the stator coil.

19. The method of claim 17, wherein the step of waiting for the catalyzed resin material to penetrate the stator coil comprises:

a. A first waiting time during which the catalyzed resin material is being dispensed onto the stator coil and
  b. A second waiting time during which the catalyzed resin material is not being dispensed onto the stator coil.

20. The method of claim 19, wherein the second waiting time is less than the first waiting time.

21. The method of claim 11, wherein the step of applying the catalyzed resin material further comprises:

a. Orienting the wound stator core with its axis at a first angle with respect to vertical;
  b. Rotating the wound stator core about its axis;
  c. Aligning a number of nozzles with the coil heads protruding from the stator core;
  d. Dispensing the catalyzed resin material via the nozzles onto the coil heads while the wound stator core rotates about its axis;
  e. Tilting the axis of the wound stator core to a second angle with respect to vertical;
  f. Aligning the nozzles with the coil heads protruding from the stator core;
  g. Dispensing the catalyzed resin material via the nozzles onto the coil heads while the wound stator core rotates about its axis;
  h. Flipping the axis of the wound stator core approximately 180 degrees;
  i. Aligning the nozzles with the coil heads protruding from the stator core;
  j. Dispensing the catalyzed resin material via the nozzles onto the coil heads while the wound stator core rotates about its axis;

and wherein the steps of dispensing further comprise moving the nozzles radially relative to the axis of the wound stator core during dispensing of the catalyzed resin material.

22. The method of claim 21, wherein the step of tilting the axis further comprises tilting the wound stator core to a first angle which is approximately 10 degrees with respect to vertical and the second angle is approximately 30 degrees with respect to vertical.

23. A method for coating an electromagnetic coil with an insulating catalyzed resin material wherein the viscosity and the curing rate of the catalyzed resin material are affected by heat, the method comprising the steps of:

a. Heating the coil to a first temperature at which temperature the catalyzed resin material is a free flowing liquid;
  b. Preheating the catalyzed resin material to approximately the first temperature before applying the catalyzed resin material to the coil;
  c. Applying the catalyzed resin material as a free flowing liquid to the coil;
  d. Waiting for the catalyzed resin material to penetrate the coil; and
  e. Raising the temperature of the coil to a second temperature in order to cure the catalyzed resin material in the coil;

wherein the first temperature is selected so that the catalyzed resin material has a viscosity of less than 1000 centipoises.

24. The method of claim 23, wherein the steps of heating the coil to the first temperature and raising the temperature of the coil to the second temperature comprise:

a. Supplying current to the coil to heat the coil to the first temperature;
  b. Supplying additional current to the coil to raise the temperature of the coil to the second temperature; and
  c. Limiting the current in the coil when the coil reaches a third temperature.

25. The method of claim 24, wherein the steps of supplying current and additional current to the coil comprises:

a. Supplying alternating current to the coil to cause the coil to vibrate to promote penetration of the catalyzed resin material.

26. The method of claim 24, wherein the step of heating the coil and the catalyzed resin to the first temperature comprises:

a. Selecting the temperature so that the catalyzed resin material has a viscosity of less than 1000 centipoises.

27. The method of claim 24, wherein the method further comprises:

a. Sensing the temperature of the coil and controlling the current supplied to the coil to maintain the coil at the first temperature during dispensing of the catalyzed resin material and to limit the current in the coil when the coil reaches the third temperature.

28. The method of claim 23, wherein the step of applying the catalyzed resin material comprises:

a. Dispensing the catalyzed resin material by means of a nozzle onto the coil while moving the coil and the nozzle relative to each other to insure the catalyzed resin material is uniformly applied to the coil.

29. The method of claim 24, wherein the step of applying the catalyzed resin material comprises:

a. Dispensing the catalyzed resin material by means of a nozzle onto the coil while moving the coil and the nozzle relative to each other to insure the catalyzed resin material is uniformly applied to the coil.

30. The method of claim 23, wherein the step of applying the catalyzed resin material further comprises:

a. Calculating a volume of voids in the coil and
  b. Dispensing that volume of catalyzed resin material onto the coil.

31. The method of claim 24, wherein the step of applying the catalyzed resin material further comprises:

a. Calculating a volume of voids in the coil and b. Dispensing that volume of catalyzed resin material onto the coil.

32. The method of claim 23, wherein the step of waiting for the catalyzed resin material to penetrate the coil comprises:

a. A first waiting time during which the catalyzed resin material is being dispensed onto the coil and b. A second waiting time during which the catalyzed resin material is not being dispensed onto the coil.

33. The method of claim 32, wherein the second waiting time is less than the first waiting time.

34. The method of claim 24, wherein the step of waiting for the catalyzed resin material to penetrate the coil comprises:

a. A first waiting time during which the catalyzed resin material is being dispensed onto the coil and b. A second waiting time during which the catalyzed resin material is not being dispensed onto the coil.

35. The method of claim 34, wherein the second waiting time is less than the first waiting time.

36. A method for coating an electromagnetic coil with an insulating catalyzed resin material wherein the viscosity and the curing rate of the catalyzed resin material are affected by heat, the method comprising the steps of:

a. Heating the coil to a first temperature at which temperature the catalyzed resin material is a free flowing liquid;

b. Calculating a volume of voids in the coil;

c. Dispensing that volume of catalyzed resin material onto the coil;

d. Applying the catalyzed resin material as a free flowing liquid to the coil;

e. Waiting for the catalyzed resin material to penetrate the coil; and f. Raising the temperature of the coil to a second temperature in order to cure the catalyzed resin material in the coil.

37. The method of claim 36, wherein the steps of heating the coil to the first temperature and raising the temperature of the coil to the second temperature comprise:

a. Supplying current to the coil to heat the coil to the first temperature;

b. Supplying additional current to the coil to raise the temperature of the coil to the second temperature; and c. Limiting the current in the coil when the coil reaches a third temperature.

38. The method of claim 37, wherein the steps of supplying current and additional current to the coil comprises:

a. Supplying alternating current to the coil to cause the coil to vibrate to promote penetration of the catalyzed resin material.

39. The method of claim 36, wherein the method further comprises:

a. Preheating the catalyzed resin material to approximately the first temperature before applying the catalyzed resin material to the coil.

40. The method of claim 37, wherein the method further comprises:

a. Preheating the catalyzed resin material to approximately the first temperature before applying the catalyzed resin material to the coil.

41. The method of claim 36, wherein the step of heating the coil and the catalyzed resin to the first temperature comprises:

a. Selecting the temperature so that the catalyzed resin material has a viscosity of less than 1000 centipoises.

42. The method of claim 37, wherein the step of heating the coil and the catalyzed resin to the first temperature comprises:

a. Selecting the temperature so that the catalyzed resin material has a viscosity of less than 1000 centipoises.

43. The method of claim 37, wherein the method further comprises:

a. Sensing the temperature of the coil and controlling the current supplied to the coil to maintain the coil at the first temperature during dispensing of the catalyzed resin material and to limit the current in the coil when the coil reaches the third temperature.

44. The method of claim 36, wherein the step of applying the catalyzed resin material comprises:

a. Dispensing the catalyzed resin material by means of a nozzle onto the coil while moving the coil and the nozzle relative to each other to insure the catalyzed resin material is uniformly applied to the coil.

45. The method of claim 37, wherein the step of applying the catalyzed resin material comprises:

a. Dispensing the catalyzed resin material by means of a nozzle onto the coil while moving the coil and the nozzle relative to each other to insure the catalyzed resin material is uniformly applied to the coil.

46. The method of claim 36, wherein the step of waiting for the catalyzed resin material to penetrate the coil comprises:

a. A first waiting time during which the catalyzed resin material is being dispensed onto the coil and b. A second waiting time during which the catalyzed resin material is not being dispensed onto the coil.

47. The method of claim 46, wherein the second waiting time is less than the first waiting time.

48. The method of claim 37, wherein the step of waiting for the catalyzed resin material to penetrate the coil comprises:

a. A first waiting time during which the catalyzed resin material is being dispensed onto the coil and b. A second waiting time during which the catalyzed resin material is not being dispensed onto the coil.

49. The method of claim 48, wherein the second waiting time is less than the first waiting time.

50. A method for coating the stator coil of a wound stator core of an electric motor with an insulating catalyzed resin material, wherein the viscosity and the curing rate of the catalyzed resin material is effected by heat and wherein the wound stator core has an axis and includes an iron stator core with slots therein for containing the stator coils and wherein the stator coils protrude axially from both ends of the slots of the iron stator core to form coil heads with interstitial windows between the coil heads, the method comprising the steps of:

a. Orienting the wound stator core with its axis at a first angle with respect to vertical;

c. Rotating the wound stator core about its axis;

d. Heating the stator coil to a first temperature at which temperature the catalyzed resin material is a free flowing liquid;

c. Aligning a number of nozzles with the coil heads protruding from the stator core;

d. Dispensing the catalyzed resin material via the nozzles onto the coil heads while the wound stator core rotates about its axis;

e. Tilting the axis of the wound stator core to a second angle with respect to vertical;
f. Aligning the nozzles with the coil heads protruding from the stator core;
g. Dispensing the catalyzed resin material via the nozzles onto the coil heads while the wound stator core rotates about its axis;
h. Flipping the axis of the wound stator core approximately 180 degrees;
i. Aligning the nozzles with the coil heads protruding from the stator core;
j. Dispensing the catalyzed resin material via the nozzles onto the coil heads while the wound stator core rotates about its axis;
g. Waiting for the catalyzed resin material to penetrate the stator coil within the slots of the stator core; and
h. Raising the temperature of the stator coil to a second temperature in order to cure the catalyzed resin material in the stator coil.

* * * * *